US008720720B2

(12) United States Patent
Li

(10) Patent No.: US 8,720,720 B2
(45) Date of Patent: May 13, 2014

(54) HOUSING AND METHOD FOR MANUFACTURING SAME

(75) Inventor: Bi-Feng Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/328,047

(22) Filed: Dec. 16, 2011

(65) Prior Publication Data

US 2013/0032601 A1 Feb. 7, 2013

(30) Foreign Application Priority Data

Aug. 1, 2011 (CN) .......................... 2011 1 0217928

(51) Int. Cl.
*B65D 1/48* (2006.01)
*B32B 15/08* (2006.01)

(52) U.S. Cl.
CPC .. *B65D 1/48* (2013.01); *B32B 15/08* (2013.01)
USPC ....................................... 220/62.22; 220/676

(58) Field of Classification Search
CPC ............ B65D 1/48; B65D 1/42; B32B 15/08; B32B 15/04; B32B 27/00
USPC .................. 220/62.22, 62.14, 676, 62.11
See application file for complete search history.

(56) References Cited

U.S. PATENT DOCUMENTS

| 3,514,527 | A | * | 5/1970 | Kuo ............................ 174/84 C |
| 2004/0211668 | A1 | * | 10/2004 | Montminy et al. ........... 204/533 |
| 2006/0194092 | A1 | * | 8/2006 | Kanai et al. .................... 429/34 |
| 2007/0218338 | A1 | * | 9/2007 | Imura et al. .................... 429/34 |
| 2012/0275286 | A1 | * | 11/2012 | McGuire, Jr. .............. 369/75.11 |

* cited by examiner

*Primary Examiner* — Robert J Hicks
(74) *Attorney, Agent, or Firm* — Novak Druce Connolly Bove + Quigg LLP

(57) ABSTRACT

A housing includes a plastic panel and a metal insert. The plastic panel includes an outer surface and an inner surface, the plastic panel defines a through groove through the outer surface and the inner surface. The metal insert is integrally molded to the inner surface of the plastic panel covering, the through groove so it is capable of seeing a metallic pattern corresponding to the through groove viewing through the through groove.

8 Claims, 4 Drawing Sheets

HOUSING AND METHOD FOR MANUFACTURING SAME

BACKGROUND

1. Technical Field

The disclosure generally relates to housings, and particularly relates to a housing used in portable electronic devices and method for manufacturing the housing.

2. Description of Related Art

With the development of wireless communication and information processing technology, portable electronic devices (such as mobile telephones and notebook computers) are now widely used. Decorative pattern of the housing of the portable electronic device has become a key factor for attracting consumers.

The decorative pattern of the housing can usually be made by in-mold labeling (IML) on the housing. A decorative film with predetermine patterns is disposed and adhered on the housing within a die. However, it is difficult to form a metallic sheen and three-dimensional pattern on the housing by IML.

Therefore, there is room for improvement within the art.

BRIEF DESCRIPTION OF THE DRAWINGS

Many aspects of the exemplary housing for portable electronic device can be better understood with reference to the following drawings. These drawings are not necessarily drawn to scale, the emphasis instead being placed upon clearly illustrating the principles of the exemplary housing and method for manufacturing the housing. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
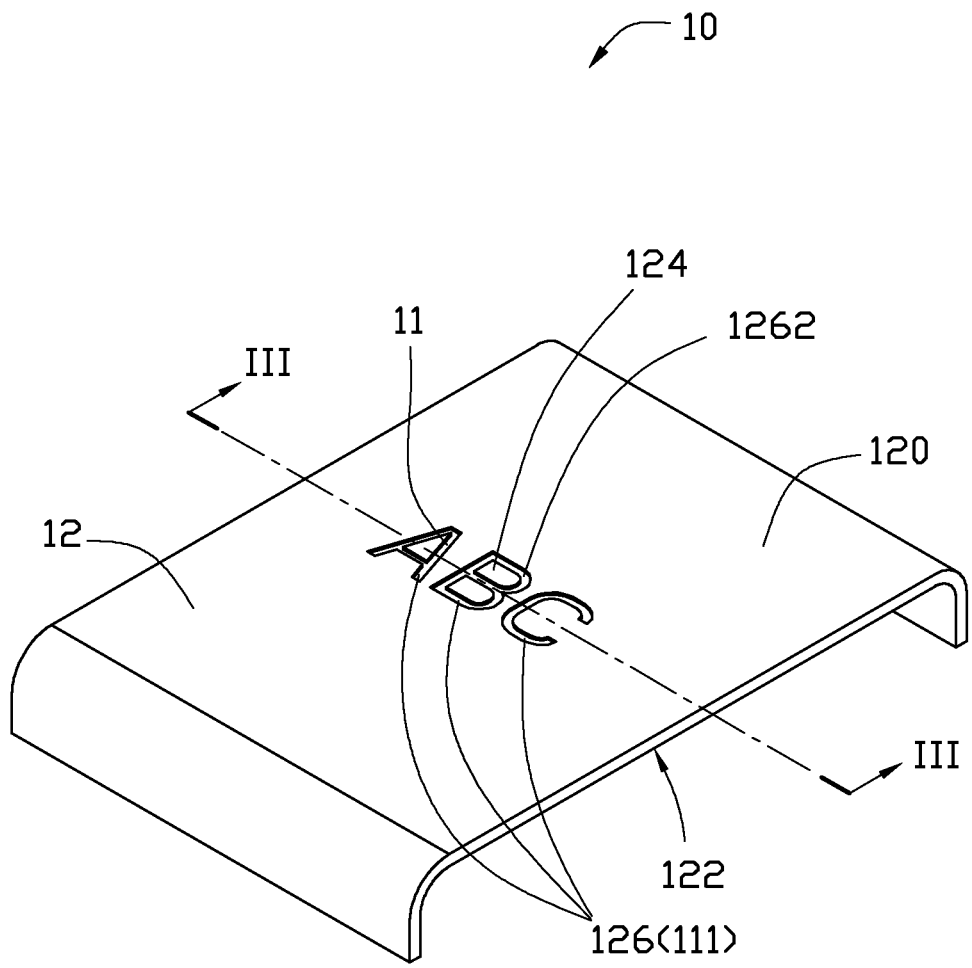
FIG. 1 is a schematic and assembled view of a housing according to an exemplary embodiment.
Figure 2:
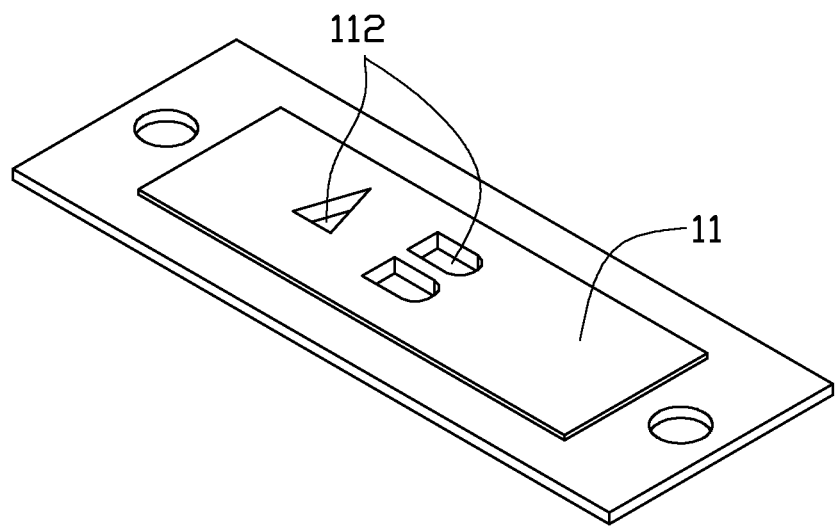
FIG. 2 is a schematic view of a metal insert of FIG. 1.
Figure 3:
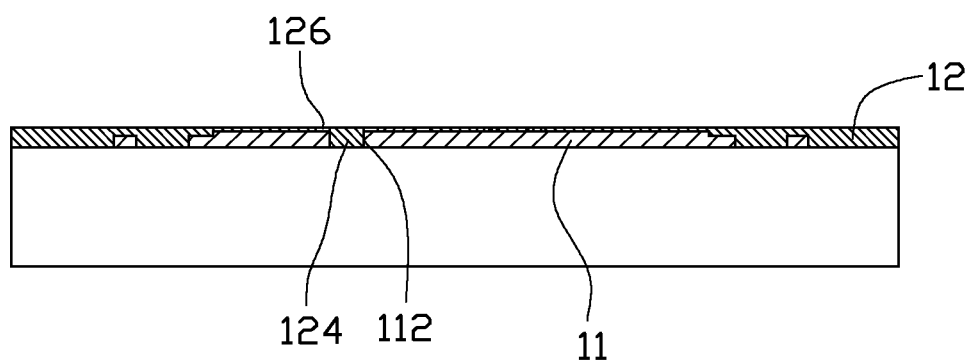
FIG. 3 is a cross-sectional view of the housing shown in FIG. 1 along the line of III-III.
Figure 4:
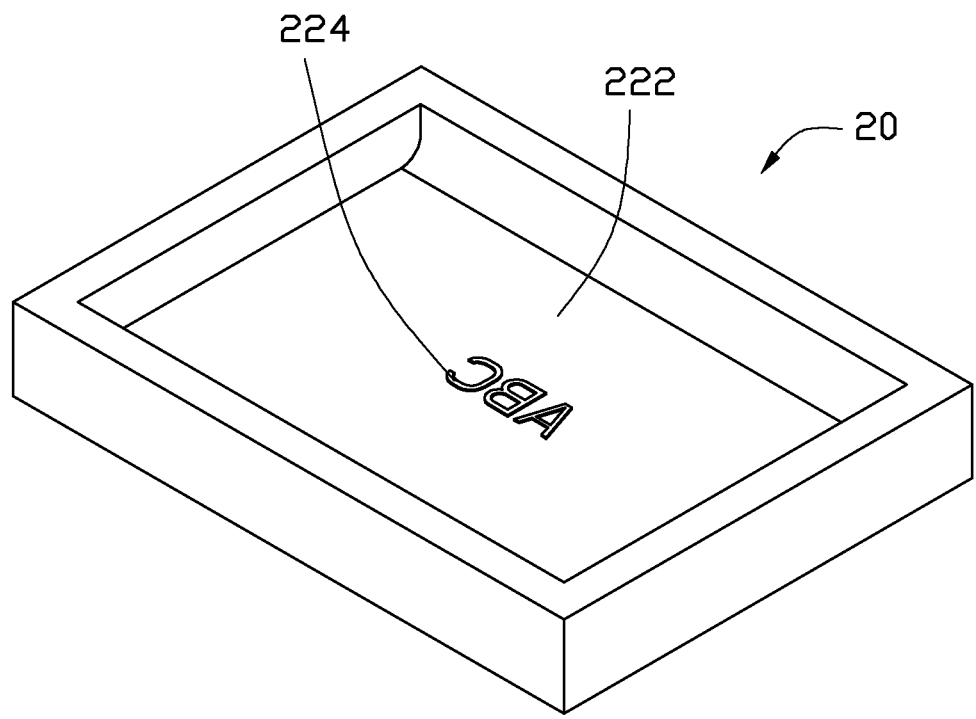
FIG. 4 is a schematic view of a mold for manufacturing the housing of FIG. 1.

An exemplary embodiment of a housing 10 of an electronic device is shown in FIGS. 1 and 2. The housing 10 includes a metal insert 11 and a plastic panel 12. The plastic panel 12 includes an outer surface 120 and an inner surface 122. The plastic panel 12 defines one or more through grooves 126 through the outer surface 120 and the inner surface 122. In this exemplary embodiment, the through grooves 126 define three letters, i.e., A, B, and C. If the through groove 126 includes at least one endless groove 1262, such as the letter "A" includes one endless groove 1262, the letter "B" includes two endless grooves 1262, the plastic panel 12 may include at least one inserted portion 124, and each inserted portion 124 is surrounded by one of the endless grooves 1262. The plastic panel 12 may be made of liquid crystal superpolymer, polyphenylene sulfide or polybutylene terephthalate.

The metal insert 11 is retained (e.g., integrally molded) to the inner surface 122 of the plastic panel 12 covering the through groove 126 so a user is capable of seeing a metallic pattern 111 corresponding to the through groove 126 viewing through the through groove 126. The metal insert 11, in this exemplary embodiment, defines at least one injecting hole 112, each injecting hole 112 aligned with one of the endless groove 1262 for injecting molten plastic into corresponding endless groove 1262 to mold corresponding inserted portion 124. Each inserted portion 124 is received in one of the injecting hole 112. It is to be understood that if there is no endless groove 1262 defined by the through groove 126, the injecting hole 112 can be omitted, such as the letter "C", the metal insert 11 has no an injecting hole 112 corresponding to the letter "C". Additionally, the injecting hole 112 can act as a retaining hole and the inserted portion 124 can act as a retaining pin, and each inserted portion 124 is retained in one of the injecting hole 112, so the metal insert 11 can be firmly fixed to the plastic panel 12 by the combination of the injecting hole 112 and the inserted portion 124. The metal insert may be made of magnesium alloy, aluminum alloy or titanium alloy.

Referring to FIGS. 1-4, a method for manufacturing a housing 10 may include the following steps. A mold including a female mold 20 and a male mold are provided. The female mold 20 defines a mold cavity 222 and a mold core 224 formed in the mold cavity 222 corresponding to the through groove 126. The metal insert 11 defining a plurality of injecting holes 112 is located in the mold cavity 222 with attaching to the mold core 224. Molten plastic is injected into the mold cavity 222 to mold a plastic panel 12 with portions of the molten plastic flowing into the injecting holes 112 to mold one inserted portion 124 in each injecting hole 112.

It is to be understood, however, that even through numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing, comprising:
   a plastic panel, the plastic panel including an outer surface and an inner surface, the plastic panel defining a through groove through the outer surface and the inner surface; and
   a metal insert, the metal insert being integrally molded to the inner surface of the plastic panel and directly covering the entire through groove such that a metallic pattern of the metal insert is seen through the through groove.

2. The housing as claimed in claim 1, wherein the through groove defines at least one endless groove, the metal insert defines at least one injecting hole, the at least one injecting hole aligned with the at least one endless groove; the plastic panel includes at least one inserted portion, the at least one inserted portion is received in the at least one injecting hole.

3. The housing as claimed in claim 1, wherein the metal insert is made of magnesium alloy, aluminum alloy or titanium alloy.

4. The housing as claimed in claim 1, wherein the plastic panel is made of liquid crystal superpolymer, polyphenylene sulfide or polybutylene terephthalate.

5. A method for manufacturing a housing defining a through groove, the method comprising:
   providing a mold, the mold comprising a female mold defining a mold cavity and a mold core formed in the mold cavity corresponding to the through groove;
   providing a metal insert defining a plurality of injecting holes, the metal insert being located in the mold cavity with attaching to the mold core;
   injecting molten plastic into the mold cavity to mold a plastic panel on the metal insert;
   wherein the plastic panel including an outer surface and an inner surface, the plastic panel defining the through groove through the outer surface and the inner surface; the metal insert is integrally molded to the inner surface of the plastic panel covering the through groove so it is capable of seeing a metallic pattern corresponding to the through groove viewing through the through groove.

6. The method as claimed in claim 5, wherein the through groove defines at least one endless groove, the metal insert defines at least one injecting hole, each injecting hole aligned with one of the endless groove; the plastic panel includes at least one inserted portion, each inserted portion is received in one of the injecting hole.

7. The method as claimed in claim 5, wherein the metal insert is made of magnesium alloy, aluminum alloy or titanium alloy.

8. The method as claimed in claim 5, wherein the plastic panel is made of liquid crystal superpolymer, polyphenylene sulfide or polybutylene terephthalate.

* * * * *